W. A. STEDMAN.
APPARATUS FOR THICKENING SLIMES.
APPLICATION FILED JAN. 19, 1915.
1,153,722.
Patented Sept. 14, 1915.
2 SHEETS—SHEET 1.
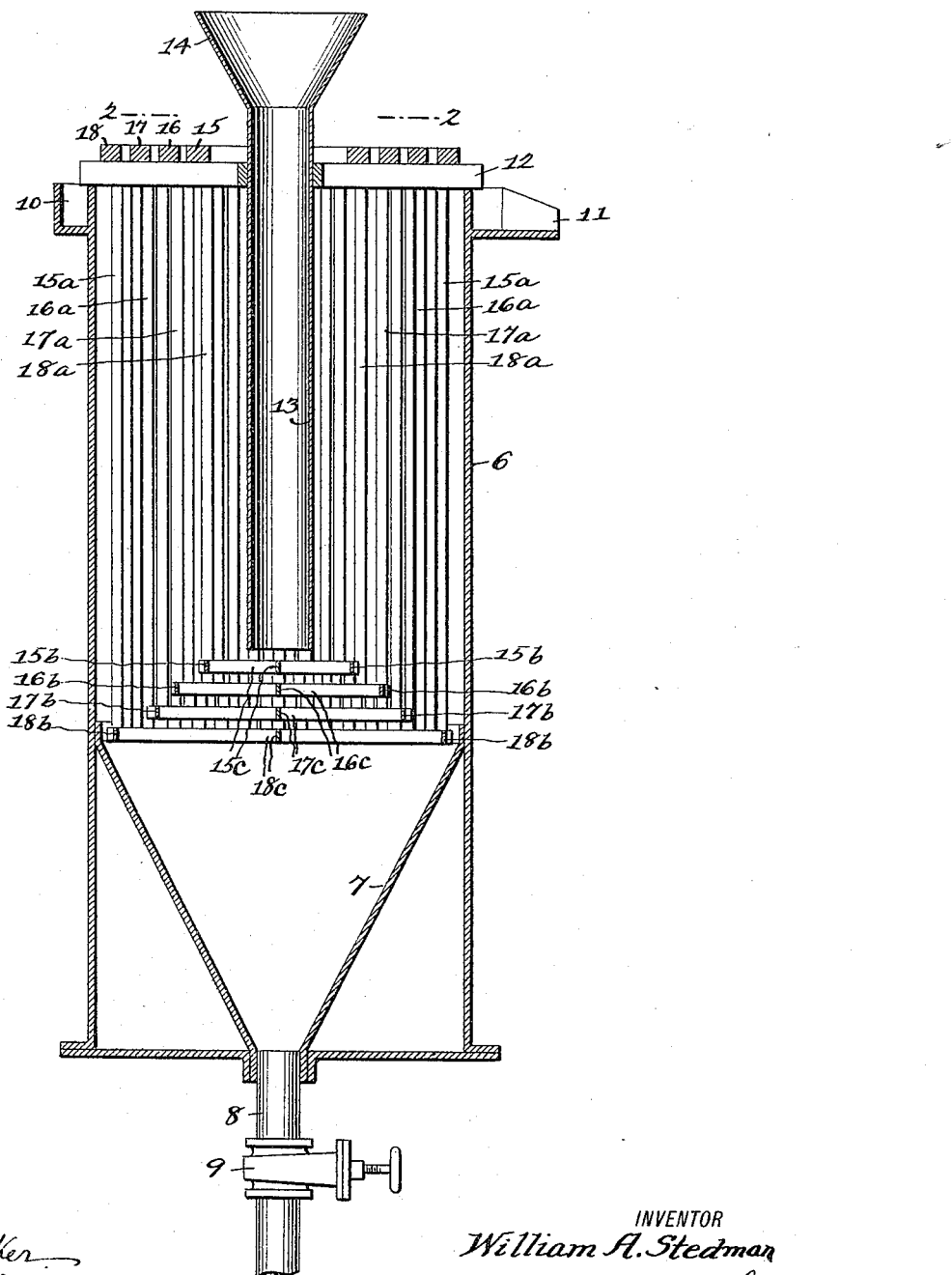
WITNESSES
H. J. Walker
J. E. Larsen
INVENTOR
William A. Stedman
BY Munn & Co
ATTORNEYS

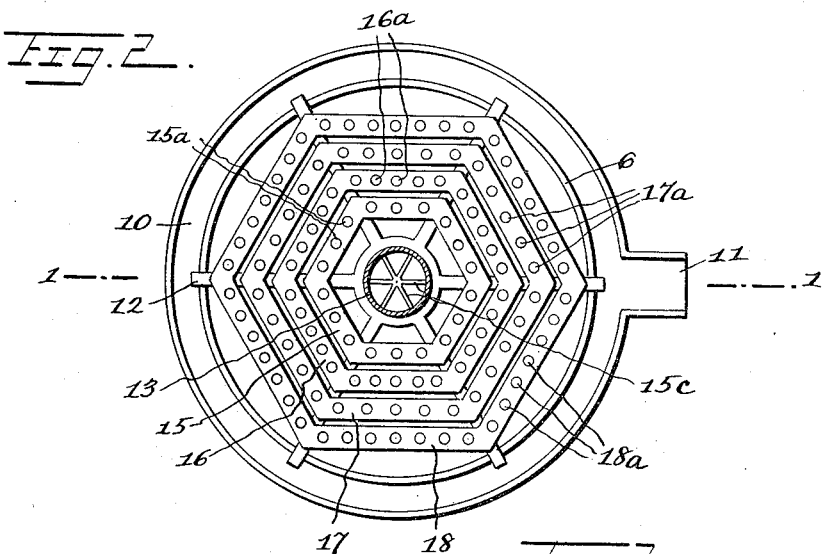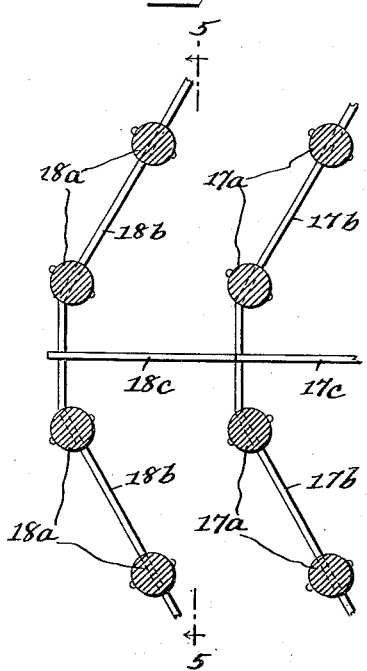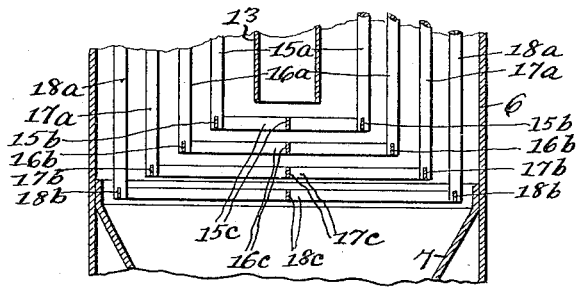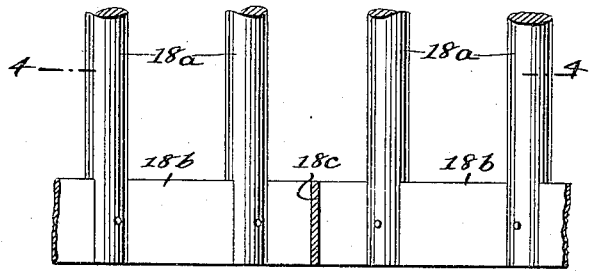

UNITED STATES PATENT OFFICE.

WILLIAM ARMOR STEDMAN, OF WONDER, NEVADA.

APPARATUS FOR THICKENING SLIMES.

1,153,722. Specification of Letters Patent. Patented Sept. 14, 1915.

Application filed January 19, 1915. Serial No. 3,113.

*To all whom it may concern:*

Be it known that I, WILLIAM A. STEDMAN, a citizen of the United States, and a resident of Wonder, in the county of Churchill and State of Nevada, have invented certain new and useful Improvements in Apparatus for Thickening Slimes, of which the following is a specification.

My invention relates to the treatment of ores, as by the cyanid process, for the recovery of metals, and the main object thereof is to provide an apparatus which will remove excess water or solution from the slimes to thicken the same, after the slimes, or finely ground ores, have been mixed with water or solution to form pulp.

A further object is to provide such apparatus which is continuous in operation.

A further object is to provide means, in such apparatus, for insuring the formation of channels through the pulp for the water or solution as the density of the pulp increases; and further objects are to provide such apparatus which is very simple in construction and operation, requires no attention after having been adjusted, which is very inexpensive, and which may be used for purposes other than the recovery of metals from ores by the cyanid process.

My invention is fully described in the following specification, of which the accompanying drawings form a part, in which like reference characters are used to designate like parts in each of the views, and in which:—

Figure 1 is a central, vertical, section taken through my apparatus; Fig. 2 is a section taken on the line 2—2 of Fig. 1; Fig. 3 is a fragmentary section, similar to Fig. 1, with the parts in the rear omitted for simplification of understanding of the structure; Fig. 4 is an enlarged, fragmentary, transverse, section, as on the line 4—4 of Fig. 5; and Fig. 5 is a section taken on the line 5—5 of Fig. 4.

In the drawings forming a part of this application I have shown a present preferred form of embodiment of my invention, comprising a tank 6 having a hopper-shaped bottom 7 leading to a discharge pipe 8 controlled by a valve 9, and said tank is provided with an annular trough 10 around the upper edge thereof in turn provided with a discharge spout 11. Resting upon the top of the tank is a spider 12 and serving as a support for a centrally arranged, vertical, pipe 13 open at its lower end and having a funnel 14 at its upper end, and I prefer to terminate the lower end of said pipe in a plane at a material distance above that of the upper edge of the hopper-shaped bottom 7. Also resting upon the spider 12 are a plurality of frames, four in number in the form illustrated and designated 15, 16, 17, and 18, and the general arrangement of which is concentric with the cylindrical body of the tank, said frames being shown as hexagonal, but they may be of any desired conformation, and of any desired number. Depending from each of the said frames are a plurality of rods, $15^a$, $16^a$, $17^a$, and $18^a$, arranged in substantially concentric series, the lower ends of the rods of each series being joined by thin plates $15^b$, $16^b$, $17^b$, and $18^b$, respectively, and serving as braces to maintain the said lower ends of all the series in a substantially concentric formation, and I also provide transverse, stiffening, braces $15^c$, $16^c$, $17^c$, and $18^c$ for the lower ends of the respective frames; by reference to Figs. 1 and 3 it will be noted that the lower ends of the respective series of rods are in a step-by-step arrangement, the inner series highest and the outer lowest. It will also be noted that the plates and braces at the lower ends of the series of bars are in vertical planes in order to present as little obstructing surface as possible to the pulp, and the inner series of rods is not so long as the outer for the reason that the pulp nearest the pipe 13 is naturally less dense than that nearest the walls of the tank, and the water or solution may rise more readily adjacent the pipe for this reason, and the greatest length of rod is not required at this position.

In settling tanks as at present employed the water or solution is permitted to find its way through the pulp to the surface thereof by erratic and inconstant channels, and the thickening of the pulp requires a considerable length of time, but with my rods in the several series a relatively enormous smooth surface is provided over which direct and constant channels are formed by the rising water or solution, this being the function of said rods, and no channels need be formed through the gradually thickening and resisting pulp.

In practice, the valve 9 is first closed and the pulp is then admitted into the pipe 13, passing therethrough to the bottom of the tank and gradually rising in the tank until it passes the lower end of said pipe, at which time the slimes begin to settle leaving a layer of practically clear solution at the top of the mass. By the time the tank is full a considerable quantity of solution will have collected on top of the pulp while the pulp at the bottom of the tank will have a density greater than that of the incoming stream of pulp. This increase in the density of the pulp at the bottom of the tank tends to force the solution upwardly because the ore particles, by virtue of their superior weight, tend to crowd more closely together as they approach the bottom of the tank, and, as the line of least resistance is at the surfaces of the rods arranged vertically in the tank, channels or lines of movement of the solution are formed at said rods, and a comparatively rapid precipitation of the slimes results, thus thickening the pulp. When the tank is filled the lighter solution at the top thereof overflows into the trough 10 and passes thence to the spout 11, whence it may be led to any desired point; if the valve 9 be now opened, the ore particles of greater weight flow from the tank, and, as long as the proper ratio between the amount of pulp admitted and the amount withdrawn through the valve 9 is maintained, the operation of the device is continuous. Furthermore, the channels around the vertical rods will persist and form an easy means or route of escape for the solution contained in the underlying portions of the pulp. It is this action, the formation and maintenance of open channels along the vertical rods from the lower ends thereof to the upper surface of the pulp, that accounts for increased efficiency of my apparatus over the ordinary type of settling tanks. In this ordinary type, the solution from the lower layers of pulp must find its way upward as best it can against the descending slimes, with a maximum of mutual interference, whereas, by means of my rods, the solution is directed along definite, straight, paths, thus allowing the slimes to settle more freely and rapidly because of the practical absence of interference with the rising solution. My invention, therefore, consists in the provision of means whereby such direct and constant paths for the rising solution are assured and, while I have shown rods for such purpose, I do not confine myself thereto, nor to the specific size or shape thereof, nor to the number thereof, nor to the material of which they are composed, nor to the manner of holding them in place, but I do prefer to provide as great a surface as possible, or rather a multiplicity of surfaces in a multiplicity of positions, for leading the solution upwardly, providing the obstructing displacement thereof is at a minimum with respect to the tank capacity.

Having fully described my invention, what I claim as new, and desire to secure by Letters Patent, is:—

1. A device of the class described, comprising a tank, an inlet for matter in solution, vertically arranged means for forming and maintaining paths for the liquid of such solution upwardly through the solid matter in said solution precipitated by gravity, and an outlet for the precipitate.

2. A device of the class described, comprising a tank, an inlet for matter in solution, vertically arranged means for forming and maintaining paths for the liquid of such solution upwardly through the solid matter in said solution precipitated by gravity, and a controllable outlet for said precipitate.

3. A device of the class described, comprising a tank, an inlet for matter in solution, vertically arranged means for forming and maintaining paths for the liquid of such solution upwardly through the solid matter in said solution precipitated by gravity, means for leading off said liquid, an outlet for said precipitate, and means for maintaining a desired relationship of flow between the inlet and outlet to render operation continuous.

4. A device of the class described, comprising a tank, an inlet pipe extending to a predetermined point therein, an outlet pipe, a valve therefor, and a plurality of vertical elements held in said tank and extending from the top thereof to beneath said inlet pipe.

5. A device of the class described, comprising a tank, an inlet pipe extending to a predetermined point therein, an outlet pipe, a valve therefor, a plurality of series of a plurality of vertical elements, each, held in said tank, all of said elements extending beneath said inlet pipe, and the series of elements being extended further downwardly into said tank, successively, from the center of said tank to the walls thereof.

6. A device of the class described, comprising a tank, an inlet pipe extending downwardly and centrally thereinto, to a predetermined point, an outlet pipe at the bottom of said tank, a valve therefor, a plurality of series of a plurality of vertical elements, each, held in said tank, substantially concentric with said inlet pipe, and extending beneath the same, and means for maintaining said elements in desired relationship.

In testimony whereof I have signed my name to this specification in the presence of two subscribing witnesses.

WILLIAM ARMOR STEDMAN.

Witnesses:
EDGAR JOHN LORTON,
WILLIAM HENRY MANNING.